Patented Jan. 21, 1936

2,028,384

UNITED STATES PATENT OFFICE 2,028,384

VAT DYESTUFFS OF THE ANTHRACENE SERIES

Wilhelm Eckert and Otto Braunsdorf, Frankfort-on-the-Main-Hochst, Germany, assignors to General Aniline Works, Inc., New York, N. Y., a corporation of Delaware No Drawing. Application February 16, 1933, Serial No. 657,102. In Germany February 22, 1932

4 Claims. (Cl. 260—44)

Our present invention relates to new vat dyestuffs of the anthracene series, more particularly it relates to new dyestuffs which are probably anthracoylene-di-(aryl-imidazoles) of the general formula:

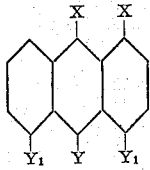

wherein one $Y_1$ stands for hydrogen and the other $Y_1$ jointly with $Y$ on the one side and the two $X$'s jointly on the other side stand for the bivalent radical

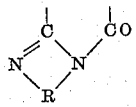

in which grouping R represents an aromatic radical bound in two adjacent positions to the N-atoms.

The new dyestuffs are obtainable by condensing anthracenetetracarboxylic acids or the dianhydrides of these acids of the formulae:

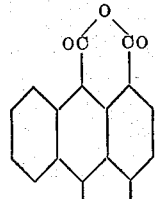

and

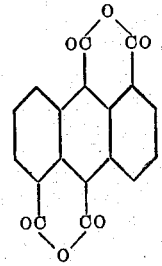

or substitution products thereof with an ortho-diamine or a salt thereof in the presence or absence of dissolving or diluting agents, such as water, glacial acetic acid, acetic acid, pyridine, nitrobenzene etc. Or the condensation may be carried out by melting the starting materials in an excess of the ortho-diamine to be condensed with the anthracenetetracarboxylic acid.

Another method of preparing our new dyestuffs consists in condensing the anthracenetetracarboxylic acids or their anhydrides with an ortho-nitro-amine and treating the anthracenetetracarboxylic-di-(ortho-nitroarylimides) thus formed with a reducing agent whereby the nitro group is reduced to the amino group and simultaneously ring-closure with formation of the corresponding imidazol-derivatives takes place.

It is also possible to produce first intermediate products by condensing the anthracenetetracarboxylic acids or their anhydrides with ortho-diamines in the presence of dissolving or diluting agents of low boiling point and heating these intermediate products, which are anthracenetetracarboxylic-di-(ortho-aminoarylimides), either as such or in higher boiling solvents or diluents to form the di-imidazol compounds.

The new dyestuffs are distinguished by a great dyeing power and good fastness properties. They may be halogenated in the usual manner. The halogen products of our dyestuffs and other substituted products of the compounds represented by the above general formula are, of course, included within the scope of our invention.

Any ortho-diamine is suitable for the production of our dyestuffs since it is only essential that two amino groups in ortho-position to each other be present.

The anthracenetetracarboxylic acids of the above formula are obtainable by causing aceanthrene of the formula:

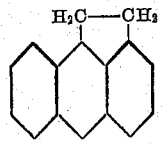

to react with malonic acid dinitrile in the presence of a metal chloride having a condensing action:

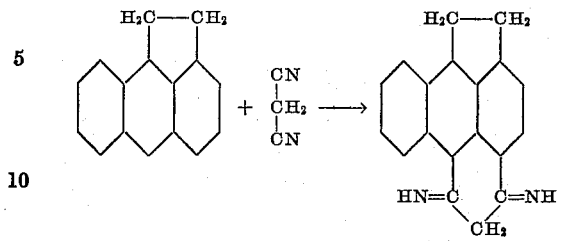

or

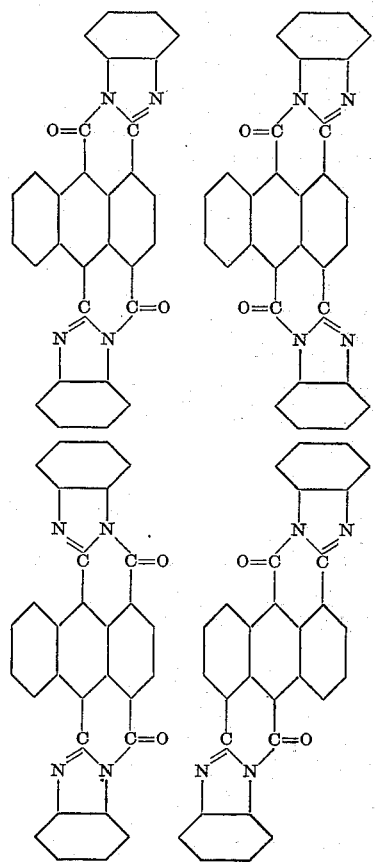

(compare, for instance, German Patent No. 557,665) treating the product thus formed with a chlorate in the presence of a hydrohalic acid and subjecting the reaction products obtained to the action of an alkaline hypochlorite solution.

The structure of our new dyestuffs is not definitely known nor is it possible to state with certainty whether the anthracenetetracarboxylic acid compounds used as starting materials contain the carboxylic acid groups in the 1,4,9,10 or 1,5,9,10-positions. Therefore, the dyestuff formed, for instance, from anthracenetetracarboxylic acid and 1,2-diaminobenzene, according to Example 2 either corresponds to one of the following formulæ or consists of a mixture of two or more of these isomerides:

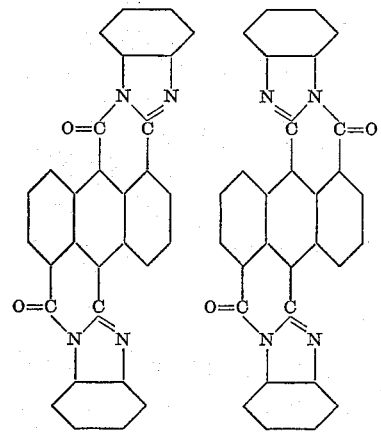

The following examples serve to illustrate the invention, but they are not intended to limit it thereto, the parts being by weight:

(1) To an aqueous solution, heated to 50° C. to 60° C., of 100 parts of the condensation product from aceanthrene and malonic acid dinitrile obtainable according to the process of the German Patent 557,665, there is added a concentrated solution of 50 parts of potassium chlorate and the whole is then run, while stirring, into about 1000 parts of hydrochloric acid of 25 per cent strength, likewise heated to 50° C. to 60° C. A yellow, insoluble compound is immediately precipitated. It is filtered by suction, washed with cold water until neutral and made into a paste by means of water. The paste thus formed is introduced into a diluted alkaline hypochlorite solution, whereby the paste begins slowly to dissolve while chloroform is split off. The solution is heated for some time at about 40° C. to about 50° C., it is then filtered and the filtrate is acidified after removal of the excess of hypochlorite. The anthracenetetracarboxylic acid separates in the form of a yellow precipitate and dissolves in concentrated sulfuric acid to a red solution. It is soluble in diluted alkalies and is precipitated again by means of acids.

(2) 35 parts of anthracenetetracarboxylic acid or the corresponding quantity of the dianhydride thereof are heated to boiling temperature in about 15 times their weight of glacial acetic acid with 25 parts of 1,2-diaminobenzene; after a short time the separation of the dyestuff in the form of small dark-blue crystals takes place. As soon as the condensation is finished, the dyestuff is filtered by suction, while hot, and washed with hot glacial acetic acid and with water. The dry dyestuff represents a dark-blue, nearly black microcrystalline powder; it dissolves in concentrated sulfuric acid to a green solution and dyes cotton from a red alkaline hydrosulfite vat dark-blue tints of good fastness properties. The dyestuff possesses a great dyeing power and a good affinity for the fiber. It may be further purified according to usual methods. The condensation may also be carried out in other solvents as, for instance, nitrobenzene, or by simply heating the mixture of the components.

(3) 35 parts of anthracenetetracarboxylic acid are heated to boiling temperature with 30 parts of 4-ethoxy-1,2-diaminobenzene in about 15 times their weight of glacial acetic acid, whereby after a short time, the separation of a dark-blue microcrystalline dyestuff sets in. When unaltered anthracenetetracarboxylic acid can no longer be detected, the dyestuff is filtered by suction while hot and washed with hot glacial acetic acid and water. In the dry state the dyestuff represents a nearly black powder, dissolving in concentrated sulfuric acid to a green solution. It is sparingly soluble in boiling nitrobenzene with a cyaneous solution. On cooling of the said solution in nitrobenzene, the dyestuff crystallizes again in the form of dark-blue crystals. It yields a red fluorescent hydrosulfite vat from which cotton is dyed dark-blue tints of good fastness properties.

We claim:

1. The vat dyestuffs which are identical with the products obtainable by condensation of an aromatic ortho-diamino compound of the benzene series with an anthracene-tetracarboxylic acid of the general formula:

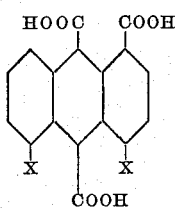

wherein one X represents a carboxylic group and the other X hydrogen.

2. The vat dyestuffs which are identical with the products obtainable by condensation of an aromatic ortho-diamino compound of the benzene series with an anthracene-tetracarboxylic acid of the general formula:

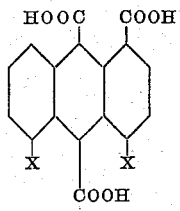

wherein one X represents a carboxylic group and the other X hydrogen.

3. The vat dyestuff which is identical with the product obtainable by condensation of ortho-phenylene-diamine in the presence of boiling glacial acetic acid with anthracene-tetracarboxylic acid of the general formula:

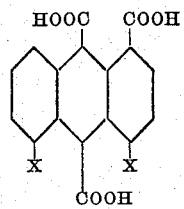

wherein one X represents a carboxylic group and the other X hydrogen, being in the dry state a dark-blue to nearly black powder, soluble in concentrated sulfuric acid with a green color, giving a red vat from which cotton is dyed dark-blue shades of good fastness properties.

4. The vat dyestuff which is identical with the product obtainable by condensation of 4-ethoxy-1.2-diaminobenzene in the presence of boiling glacial acetic acid with anthracene-tetra-carboxylic acid of the general formula:

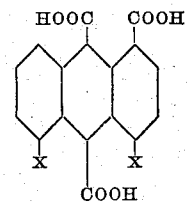

wherein one X represents a carboxylic group and the other X hydrogen, said dyestuff forming, when crystallized from nitrobenzene, dark blue crystals, yielding a red fluorescent hydrosulfite vat from which cotton is dyed dark blue tints of good fastness properties.

WILHELM ECKERT.
OTTO BRAUNSDORF.